United States Patent
Ohtaki

Patent Number: 5,917,660
Date of Patent: Jun. 29, 1999

[54] BEAM CONVERTING OPTICAL SYSTEM

[75] Inventor: Katsura Ohtaki, Tokyo, Japan

[73] Assignee: Nikon Corporation, Tokyo, Japan

[21] Appl. No.: 08/502,140

[22] Filed: Jul. 13, 1995

[30] Foreign Application Priority Data

Jul. 13, 1994 [JP] Japan .................................. 6-183940

[51] Int. Cl.$^6$ .................................................. G02B 3/06
[52] U.S. Cl. .......................................... 359/710; 359/719
[58] Field of Search .................................. 359/708, 710, 359/718, 719

[56] References Cited

U.S. PATENT DOCUMENTS

| | | | |
|---|---|---|---|
| 4,635,244 | 1/1987 | Gotoh | 369/112 |
| 5,155,631 | 10/1992 | Snyder et al. | 358/708 |
| 5,251,060 | 10/1993 | Uenishi et al. | 359/328 |
| 5,600,492 | 2/1997 | Tanaka et al. | 359/712 |
| 5,654,831 | 8/1997 | Byren et al. | 359/718 |

FOREIGN PATENT DOCUMENTS

60-19016  2/1960  Japan .

*Primary Examiner*—David C. Nelms
*Assistant Examiner*—Dawn-Marie Bey
*Attorney, Agent, or Firm*—Oliff & Berridge, PLC

[57] ABSTRACT

A beam converting optical system is provided which is easy to position the optical elements, which has a comparatively short total length, and which has good aberration correction. A beam converting optical system converts light beams with an oval cross-sectional shape into parallel light beams with a substantially circular cross-sectional shape. A converting lens is provided which has at least one surface that is cylindrical. The horizontal cross section of the cylindrical surface of the converting lens is essentially non-circular. The converting lens may consist of two similar elliptic cylinder surfaces. The two ellipses are of the shape of a horizontal cross section of the two elliptic cylinder surfaces and have the same focal point. The two elliptic cylinder surfaces of the converting lens have concave surfaces facing toward the incident light beams

16 Claims, 5 Drawing Sheets

BEAM CONVERTING OPTICAL SYSTEM

BACKGROUND OF THE INVENTION

1. Field of the Invention

This invention relates to a beam converting optical system. More particular, this invention relates to a beam converting optical system that converts light beams from a semiconductor laser having an oval cross sectional shape to form parallel light beams having a substantially circular cross-sectional shape.

2. Description of Related Art

Typically, semiconductor lasers are used as light sources in optical disk heads. Since the light emitting surface of the semiconductor laser is oval-shaped, the intensity distribution of the emitted light beams are also oval in cross-sectional shape. In order to efficiently use the emitted oval cross-sectional shaped light beams, the light beams are converted from an oval cross-sectional shape to a substantially circular cross-sectional shape.

Figure 7:
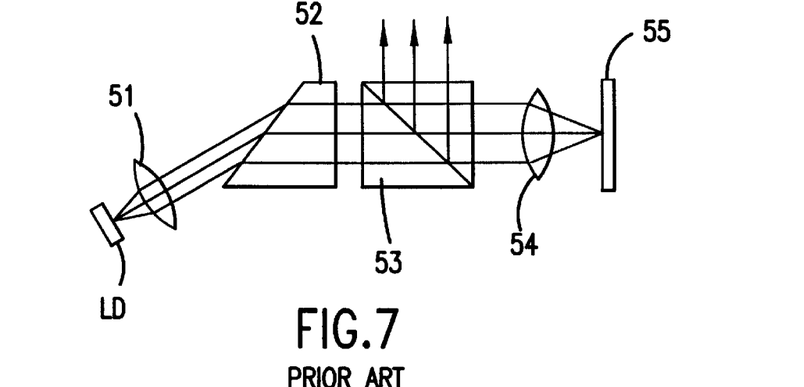
FIG. 7 shows the structure of a conventional beam converting optical system using a prism.

FIG. 7 shows the structure of a conventional beam converting optical system that uses a beam converting prism 52. A light beam from the semiconductor laser LD is converted by the collimator lens 51 into parallel light beams. The parallel light beams strike the beam converting prism 52 and are expanded in the up and down direction to become parallel light beams having a substantially circular cross-sectional shape. The converted parallel light beams pass through the beam splitter 53, the object lens 54 and are collected on a disk 55. The light reflected from the disk 55 passes back through the object lens 54 and is deflected in the upward direction by the beam splitter 53 to undergo signal detection.

The prism 52 is a converting optical element having a simple structure. The light path of the semiconductor laser LD with the collimator lens 51 and the light path of the beam splitter 53 with the object lens 54 are at different angles with respect to the prism 52. Therefore, the positioning of each optical element becomes difficult in conventional beam converting optical systems.

In addition, the laser light strikes the converting prism 52 at an angle of incidence θ of approximately 70°–80°. In order to suppress the reflection of the laser light at the incident surface of the converting prism 52, it is necessary to provide a reflection preventing membrane consisting of a multilayer coating on the incident surface of the converting prism 52. However, this reflection preventing membrane involves a substantially higher cost.

Figure 8A:
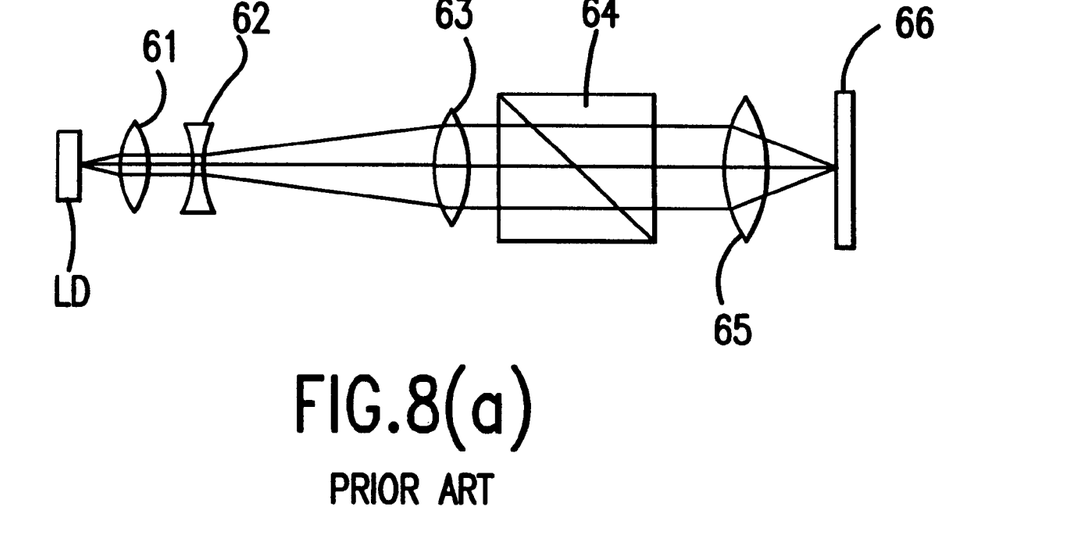
FIG. 8(a) and 8(b) show the structure of conventional beam converting optical systems using a cylindrical lens.
Figure 8B:
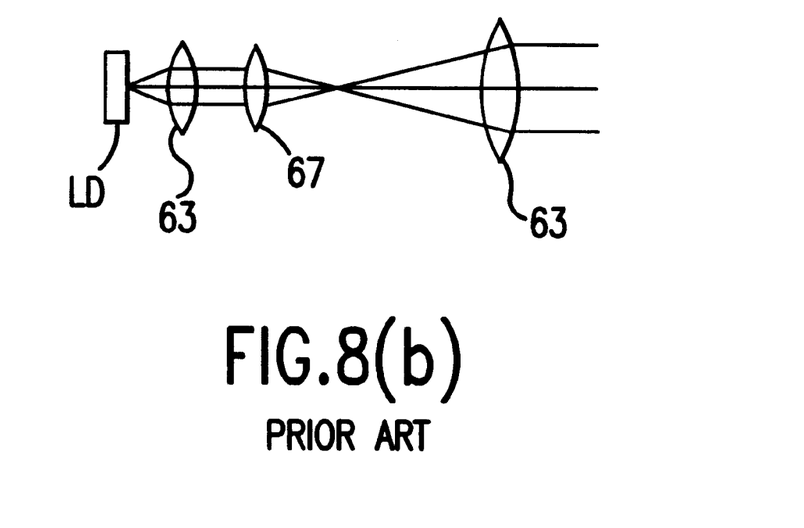

FIGS. 8(a) and 8(b) show the structure of conventional beam converting optical systems that use a cylindrical lens rather than a prism. In particular, FIG. 8(a) shows a Galilean type converting optical system while FIG. 8(b) shows a Keplerian type converting optical system.

In the Galilean type converting optical system, a light beam from the semiconductor laser LD is converted into parallel light beams by the collimator lens 61. The light then strikes a cylindrical lens 62 having a negative refractive power in the Y-direction. The cylindrical lens 62 does not have any refractive power in the Z-direction including the optical axis. After the light has been suitably expanded by the cylindrical lens 62 in the up and down directions the light passes through a collimator lens 63 having a positive refractive power in the Y-direction while generally not having any refractive power in the Z-direction including the optical axis. The light passing through the cylindrical lens 63 that has been converted into parallel light beams and has a substantially circular cross-sectional shape then passes through the beam splitter 64, the object lens 65 and is collected onto the disk 66.

In the Keplerian type converting optical systems a light beam from the semiconductor laser LD is converted into parallel light beams by the collimator lens 63. The light that has been converted into parallel light beams strikes the cylindrical lens 67 having a positive refractive power in the plane of the figure without having any refractive power in the plane perpendicular to the figure including the optical axis. After the light strikes the cylindrical lens 67 and is expanded in the up and down direction, the light strikes a collimator lens 63 having a positive refractive power in the plane of the drawing and not having any refractive power in the plane perpendicular to the figure including the optical axis The light passing through the collimator lens 63 is converted into parallel light beams having a substantial circular cross-sectional shape.

For both the Galilean type shown in FIG. 8(a) and the Keplerian type shown in FIG. 8(b) it is necessary to reduce the NA (numerical aperture) so as to suppress aberrations. That is, it is necessary to increase the spacing between the two cylindrical lenses. This increases the overall length of the optical system.

As described above, when using conventional beam converting optical systems having beam converting prisms, it is very difficult to position each optical element since the optical axis is bent by the prism. In additions since the incident light beam is at a large angle of incidence with respect to the beam converting prism, it is necessary to provide a reflection preventing membrane on the incident surface of the beam converting prism that results in an increased cost. Additionally, when using conventional beam converting prisms that use cylindrical lenses, it is necessary to make the overall length of the optical system inconveniently large in order to suppress aberrations.

SUMMARY OF THE INVENTION

An object of the present invention is to provide a beam converting optical system in which the optical elements are easily positioned, that has a comparatively short overall lens length and that has good aberration correction.

The present invention provides a beam converting optical system that converts light beams having an oval cross-sectional shape into parallel light beams with a substantially circular cross-sectional shape. A converting lens is provided having at least one surface that is completely cylindrical while the horizontal cross section of the cylindrical surface of the converting lens is substantially non-circular.

The converting lens may include two similar elliptic cylinder surfaces The two ellipses are in the shape of a horizontal cross section of the two elliptic cylinder surfaces and have the same focal point. The two elliptic cylinder surfaces of the converting lens are concave surfaces facing toward the incident light beams Other objects, advantages and salient features of the invention will become apparent from the detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

Figure 1A:
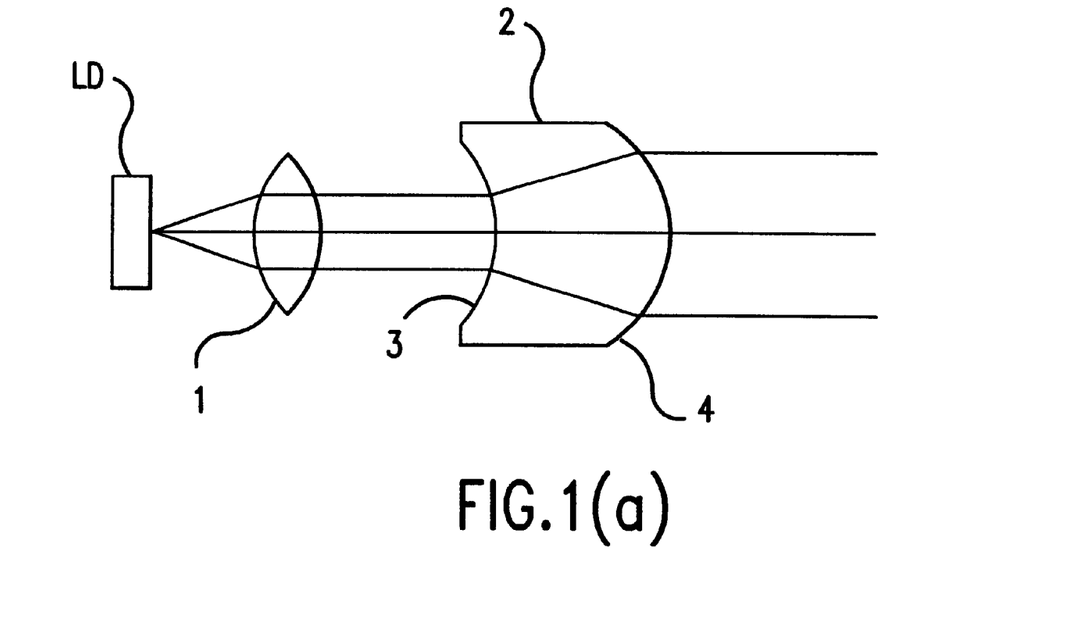
FIG. 1(a) shows a cross-sectional view parallel to the XZ plane of the beam converting optical system according to a preferred embodiment of the invention.
Figure 1B:
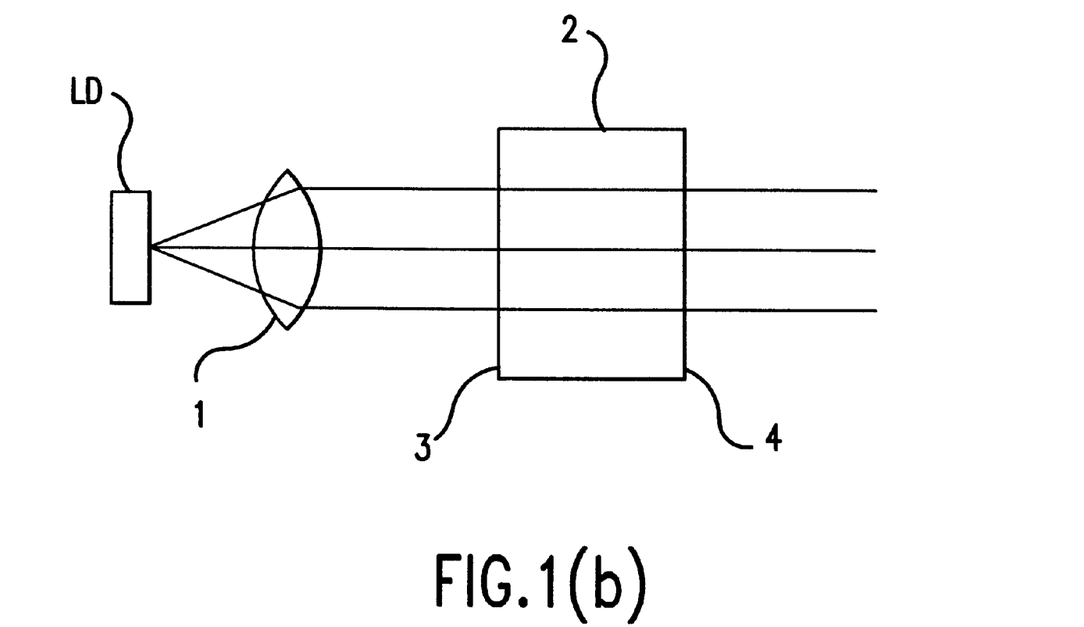
FIG. 1(b) shows a cross-sectional view parallel to the YZ plane of the beam converting optical system according to the present invention.

FIGS. 1(a) and (b) show the beam converting optical system in the XYZ coordinate system with the optical axis along the Z-axis. In particular, FIG. 1(a) shows a cross sectional view parallel to the XZ plane while FIG. 1(b) shows a cross sectional view parallel to the YZ plane. In these figures, a light beam such as from a semiconductor laser LD strikes a collimator lens 1 and is converted into parallel light beams. The light beams that pass through the collimator lens 1 have an oval-shaped cross-sectional shape and strike the converting lens 2. As shown in FIG. 1(a), the converting lens 2 expands and converts the incident beam at a predetermined magnification in the XZ plane. In the XZ plane, the incident surface 3 of the converting lens 2 is a refractive surface that diverges the incident parallel light beams. The incident surface 4 is a refractive surface that transforms the diverging light beams into parallel light beams As shown in FIG. 1(b), neither surfaces 3 nor 4 have any refractive power in the YZ plane. Thus, the incident beam is not expanded and the light passes straight through the converting lens 2.

The light that passes through the converting lens 2 is converted into parallel beams having a substantially circular cross-section.

The converting lens has at least one surface formed as a cylindrical as a whole. In FIGS. 1(a) and 1(b), both surfaces 3 and 4 are generally cylindrical shapes. At least one of the surfaces 3 and 4 has a horizontal cross section in the XZ plane that is essentially non-circular (i.e., oval-shaped).

The present invention provides a lens having at least one surface with a generally cylindrical surface shape. The horizontal cross section of this surface is essentially non-circular and may hereafter be referred to as a "non-spherical cylindrical lens."

Thus, in the beam converting optical system of the present invention, the converting lens includes at least one lens having a lens component that is a non-spherical cylindrical lens, which is effective in aberration correction. Even though the overall length of the optical system is short, aberration correction can be properly carried out with this lens unit.

When the invention is applied to an optical disk head, it is easy to position each optical element since the positions of the semiconductor laser LD, the collimator lens, the beam splitter, and the object lens can be established on an optical axis that lies in a straight line unlike the prior art beam converting optical systems. Cylindrical-shaped surfaces with essentially non-circular horizontal cross sections can be mass-produced by glass molding with essentially no cost increase.

The shape of a cylindrical-shaped surface having an essentially non-circular horizontal cross section will now be discussed. Various optical systems having no aberrations can be formed through a combination of quadratic surfaces. The converting lens of the present invention consists of two similar elliptic cylinder surfaces. The two ellipses are in the shape of a horizontal cross section of the two elliptic cylinder surfaces and have the same focal point. Thus, an aplanatic (no spherical aberration and satisfying the sine condition) a focal system can be structured.

Figure 2:
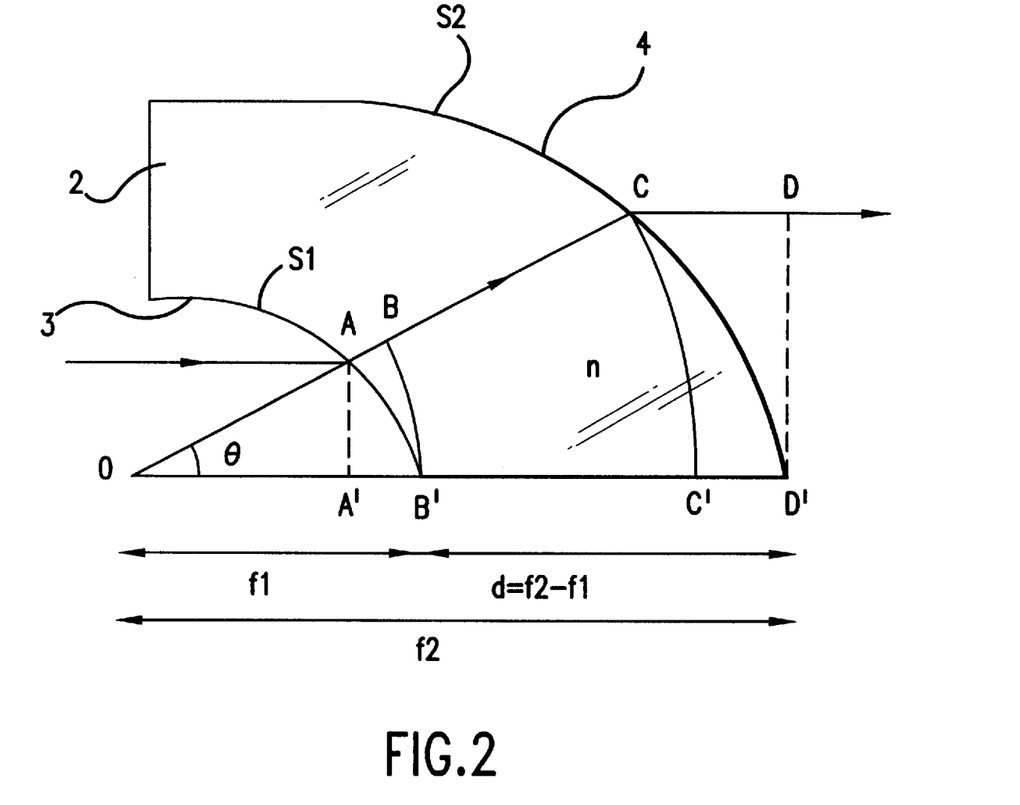
FIG. 2 shows a converting lens that forms an a planatic a focal system.

FIG. 2 will be used to describe the operation of a converting lens that forms an aplanatic a focal system. To convert a plane wave AA' to a spherical wave BB' (with the origin at O, radius f1) through light incident surface S1, the light path length AB should be the same as A'B'. In other words, if r1=OA, the light paths AB and A'B' are expressed by Equations (1) and (2), respectively.

$$AB = n*(f1-r1) \tag{1}$$

$$A'B' = f1 - r1*\cos\theta \tag{2}$$

From equations (1) and (2), the shape of surface S1 (using polar coordinates) can be expressed by Equation (3).

$$r1 = (n-1)*f1/(n-\cos\theta) \tag{3}$$

Equation (3) expresses an ellipse. Thus, the plane wave AA' is converted into a spherical wave BB' (having an origin at O) through the elliptic cylinder surface S1 as expressed by Equation (3).

To convert the spherical wave CC' (having an origin at O), to the plane wave DD' (with D' being separated from the origin O by the distance f2) through the light exit surface S2, the length of the light path CD should be the same as the length of the light path C'D'. In other words, if r2=OC, the light paths CD and C'D' are expressed by Equations (4) and (5), respectively.

$$CD = f2 - r2*\cos\theta(\text{theta}) \tag{4}$$

$$C'D' = n*(f2-r2) \tag{5}$$

From Equations (4) and (5), the shape of surface S2 (using polar coordinates) can be expressed by equation (6).

$$r2 = (n-1)*f2/(n-\cos\theta(\text{theta})) \tag{6}$$

Equation (6) also expresses an ellipse. Thus, the spherical wave CC' is converted into the plane wave DD' through the elliptic cylinder surface S2 as expressed by Equation (6).

In FIG. 2, the elliptic cylinder surface S1 and the elliptic cylinder surface S2 are similar to each other and are positioned so as to share the same focal point O. In other words, the focal point 0 which, among the two focal points of the ellipse that has the shape of a horizontal cross section of the elliptic cylinder surface S1, is the focal point on the left side of the drawing, coincides with the focal point which, among the two focal points of the ellipse that has the shape of a horizontal cross section of the elliptic cylinder surface S2, is the focal point on the left side of the drawing.

In FIG. 2, point A is the point at which the light strikes the elliptic cylinder surface S1, and point C is the point at which the light strikes the elliptic cylinder surface S2. Further, f1 is the focal length in the lengthwise direction (along the major axis) of the ellipse that is the horizontal cross section of the elliptic cylinder surface S1 and f2 is the focal length in the lengthwise direction (along the major axis) of the ellipse that is the horizontal cross section of the elliptic cylinder surface S2.

The plane wave AA' is converted into the spherical wave BB' through the elliptic cylinder surface S1. The spherical wave CC' is then converted into the plane wave DD' through the elliptic cylinder surface S2. The spherical waves BB' and CC' share the same center position. Thus, an a focal system having no spherical aberration can be formed using a converting lens having two elliptic cylinder surfaces expressed by Equations (3) and (6).

The height H1 of the light ray incident on the surface S1 and the height H2 of the light ray exiting the surface 4 are expressed by Equations (7) and (8), respectively.

$$H1 = r1^* \sin\theta \quad (7)$$

$$H2 = r2^* \sin\theta \quad (8)$$

From the similarity of the elliptic cylinder surface S1 and the elliptic cylinder surface S2 the following relationship expressed in Equation (9) arises.

$$H2/H2 = r2/r1 = f2/f1 = \text{constant (beam converting ratio)} \quad (9)$$

Thus, for a converting lens having two elliptic cylinder surfaces expressed by Equations (3) and (6), the sine condition of an a focal system (i.e., the ratio H2/H1 is fixed) is satisfied. Thus, the converting lens 2 of FIG. 2 is an aplanatic a focal system which satisfies the sine condition.

The actual surface shapes of the elliptic cylinder surface S1 and the elliptic cylinder surface S2 satisfy the relationships shown in the following Equations (10)–(13).

$$m = f2/f1 \quad (10)$$

$$d = f2 - f1 = (m-1)^* f1 \quad (11)$$

$$a1 = (n-1)f1/n \quad (12)$$

$$a2 = (n-1)f2/n = m^* a1 \quad (13)$$

where:
f1=focal length in the lengthwise direction of elliptic cylinder surface S1
f2=focal length in the lengthwise direction of elliptic cylinder surface S2
m=beam shaping magnification
d=distance between elliptic cylinder surface S1 and elliptic cylinder surface S2 along the optical axis (center lens thickness)
n=index of refraction of lens
n=near-axis radius of curvature of elliptic cylinder surface S1
a2=near-axis radius of curvature of elliptic cylinder surface S2

From the required beam converting magnification m, the refractive powers (or focal lengths) of elliptic cylinder surface S1 and elliptic cylinder surface S2 are established. The lens thickness is established from the refractive powers. The shapes of the elliptic cylinder surfaces S1 and S2 are expressed by Equations (3) and (6).

Since the average value of the varying radius r when $\theta = 0$ and when $\theta = \pi$ is the major axis and since $r \times \sin\theta$ when $\theta = \cos^{-1}(1/n)$ is the minor axis, the major axis, the minor axis, and the elliptic rate of the elliptic cylinder surface are expressed by Equations (14)–(16), respectively.

$$\text{major axis} = n^* f/(n+1) \quad (14)$$

$$\text{minor axis} = f^*[(n-1)/(n+1)]^{1/2} \quad (15)$$

$$\text{elliptic rate} = (1 - 1/n^2)^{1/2} \quad (16)$$

Thus, the shape of the elliptic cylinder surfaces S1 and S2 is a function of the index of refraction n alone. The distance d on the optical axis between the elliptic cylinder surfaces S1 and S2 is a function of the beam converting magnification m.

Figure 3:
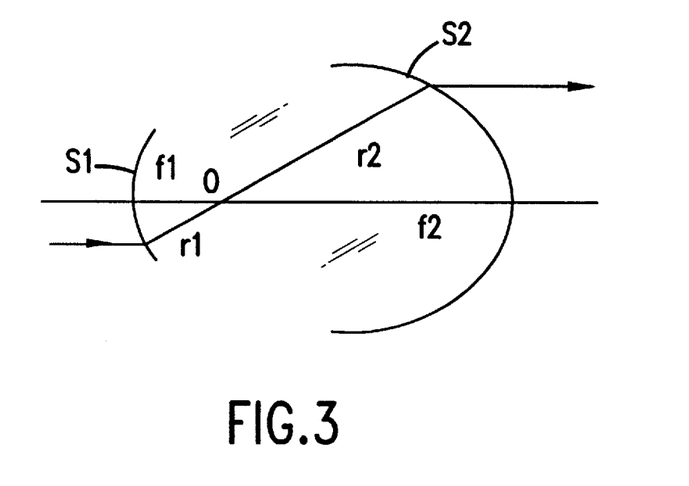
FIG. 3 shows a Keplerian type converting lens having an elliptic cylinder surface S1 with a convex surface and an elliptic cylinder surface S2 with a concave surface.

FIG. 2 shows a Galilean type converting lens having an elliptic cylinder surface S1 with a concave surface on the incident light side of the surface S1 and an elliptic cylinder surface S2 having a concave surface on the incident light side of the surface S2. FIG. 3 shows a Keplerian type converting lens having an elliptic cylinder surface S1 with a convex surface on the incident light side and an elliptic cylinder surface S2 having a concave surface on the incident light side. In FIG. 3, the elliptic cylinder surface S1 and the elliptic cylinder surface S2 are similar to each other and are appropriately positioned to share the focal point O.

The lens thickness D1 of the Galilean type converting lens of FIG. 2 and the lens thickness D2 of the Keplerian type converting lens of FIG. 3 are expressed by the following Equations (17) and (18), respectively.

$$D1 = f2 - f1 = (m-1)^* f1 \quad (17)$$

$$D2 = f2 + f1 = (m+1)^* f1 \quad (18)$$

Thus, the Galilean type converting lens of FIG. 2 can be made thinner than the Keplerian type converting lens of FIG. 3.

If higher-order non-spherical coefficients are added to the generally cylindrical quadratic surfaces, the design freedom increases and the design becomes simpler. In this case, the aberration improves by making only one of the two surfaces of the converting lens into a spherical surface shape that uses a higher-order non-spherical surface coefficient.

When the height in a direction perpendicular to the optical axis is Y, the shift amount in the optical axis direction at height Y is S(y), the standard radius of curvature is R, the conical coefficient is k, and the nth-order non-spherical surface coefficient is Cn, the non-spherical surface shape can be expressed by Equation (19).

$$S(y) = (y^2/R)/[1 + (1 - k^* y^2/R^2)^{1/2}] + C_2^* y^2 + C_4^* y^4 + C_6^* y^6 + C_8^* y^8 + C_{10}^* y^{10} + \quad (19)$$

The near-axis radius of curvature r of the non-spherical surface is defined by Equation (20).

$$r = 1/(2^* C_2 + 1/R) \quad (20)$$

Figure 4A:
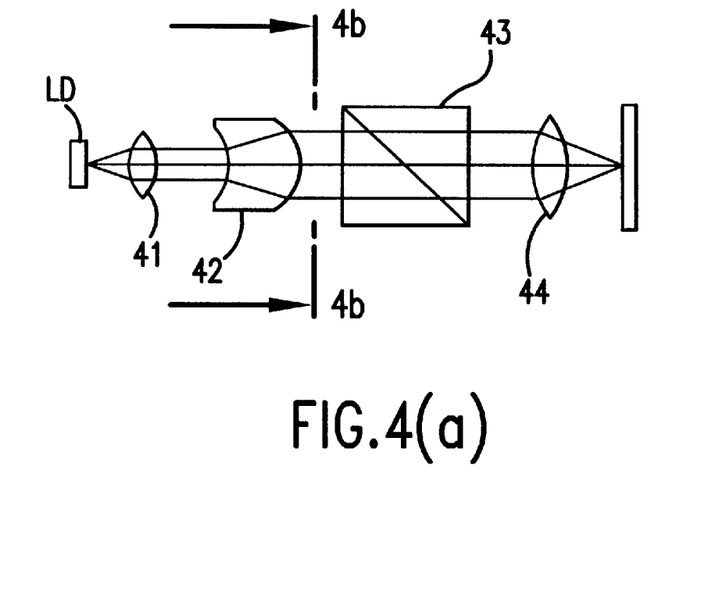
FIG. 4(a) shows a position of the converting lens according to the present invention.

As shown in FIG. 4(a), when the non-spherical surface cylindrical lenses described above are applied to an optical disk head, the converting lens 42 is normally positioned between the collimator lens 41 and the beam splitter 43. In this case, since the light beams that have been shaped into a substantially circular cross-sectional shape by the converting lens 42 strike the beam splitter 43, the beam splitter 43 is square-shaped and becomes comparatively large.

Figure 4B:
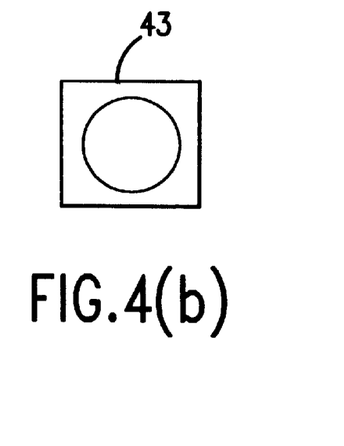
FIG. 4(b) shows a position of the converting lens according to the present invention.
Figures 4C, 4D:
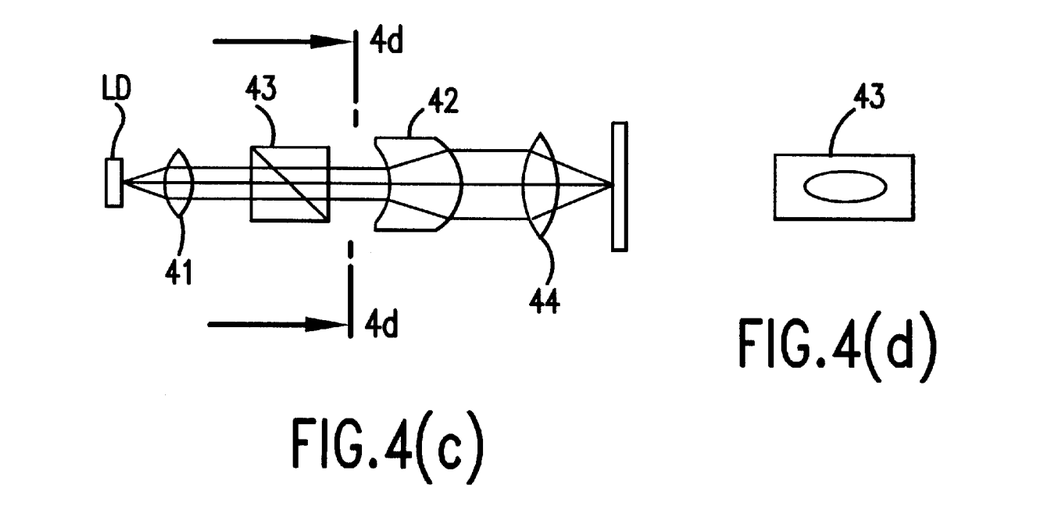

As shown in FIG. 4(b), if the converting lens 42 is positioned between the beam splitter 43 and the object lens 44, the light beams that strike the beam splitter 43 have an oval cross-sectional shape that have not yet been expanded.

As a result, the beam splitter 43 has an elongated shape and can be structured with the comparatively small proportions of 1/beam converting ratio (~1/2–1/3).

The non-spherical surface cylindrical lens of the present invention can also be used in applications other than beam converting, such as in anamorphic optical systems (optical systems on which the horizontal and vertical magnifications differ).

Figure 5:
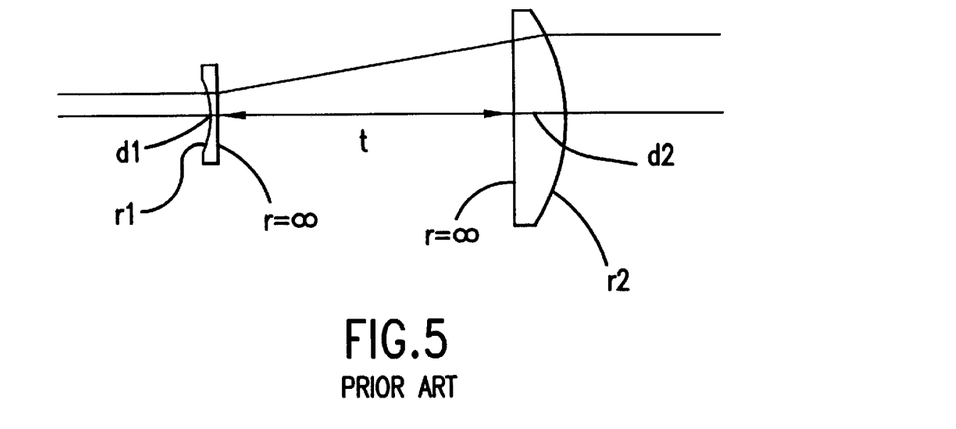
FIG. 5 shows a 2-unit; 2-piece cylindrical surface lens.

FIG. 5 shows a conventional 2-unit, 2-piece cylindrical surface lens. That is, the beam converting lens comprise (in order from the incident side) a plano-concave cylindrical lens d1 and a plano-convex cylindrical lens d2.

Figure 6:
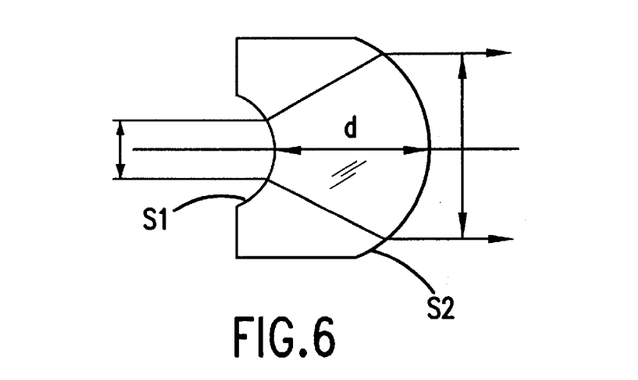
FIG. 6 shows a beam converting lens consisting of a 1-unit, 1-piece elliptic cylinder lens.

FIG. 6 shows a beam converting lens comprising a 1-unit, 1-piece elliptic cylinder lens. The beam converting lens of FIG. 6 corresponds to the converting lens of FIG. 1. The incident-side elliptic cylinder surface S1 and the exit-side elliptic cylinder surface S2 are similar to each other and share the same focal point.

The values of common items in each embodiment are as follows.

incident beam diameter=2mm×5mm exiting beam diameter=5mm $\phi$ beam converting magnification=2.5X wavelength $\lambda$ (lambda)=680 nm $\Delta W(\lambda rms)$ indicates the RMS spherical aberration, $\Delta Wd$ ($\lambda rms$) indicates the RMS wave aberration when the entire lens is made to be eccentric in the amount of 30', and TL (mm) indicates the total length (the distance from the first surface to the last surface). The units of length are all in mm.

In the following Table I, the values for comparative Example 1 and comparative Example 2 are shown. In Table I, r1 indicates the radius of curvature of the concave surface of the plano-concave cylindrical lens, r2 indicates the radius of curvature of the convex surface of the plano-convex cylindrical lens, d1 indicates the center thickness of the plano-concave cylindrical lens, d2 indicates the center thickness of the plano-convex cylindrical lens, and t indicates the space between the two lenses along the optical axis. The index of refraction indicates the value corresponding to the d-line ($\lambda$=587.6 nm).

TABLE I

|  | Comparative Example 1 | Comparative Example 2 |
| --- | --- | --- |
| glass | BK7 | BK7 |
| index |  |  |
| of refraction | 1.51021 | 1.51021 |
| r1 | 7.6532 | 6.1225 |
| d1 | 1.0 | 1.0 |
| r2 | 19.1329 | 15.3063 |
| d2 | 2.0 | 2.0 |
| t | 20.51 | 19.0 |
| TL (mm) | 23.5 | 16.0 |
| $\Delta W$ ($\lambda rms$) | 0.011 | 0.021 |

The values of the present invention are set forth in the following Table II. In Table II, a1 indicates the near-axis radius of curvature of the elliptic cylinder surface S1, a2 indicates the near-axis radius of curvature of the elliptic cylinder surface S2, f1 indicates the focal length of the elliptic cylinder surface S1 in the lengthwise direction, f2 indicates the focal length of the elliptic cylinder surface S2 in the lengthwise direction, and d indicates the center thickness of the converting lens. The index of refraction indicates the value corresponding to the d-line ($\lambda$=587.6 nm).

TABLE 2

|  | Embodiment 1 | Embodiment 2 | Embodiment 3 |
| --- | --- | --- | --- |
| glass | CaFK95 | same | same |
| index |  |  |  |
| of refraction | 1.432451 | same | same |
| d | 4.0 | 6.0 | 8.0 |
| f1 | 2.6666 | 4.000 | 5.3333 |
| f2 | 6.6666 | 10.000 | 13.3333 |
| a1 | 0.8051 | 1.2076 | 1.6101 |
| a2 | 2.0126 | 3.0190 | 4.0253 |
| TL (mm) | 4.0 | 6.0 | 8.0 |
| $\Delta W$ ($\lambda rms$) | 0.0 | 0.0 | 0.0 |
| $\Delta Wd$ ($\lambda rms$) | 0.008 | 0.006 | 0.005 |

As can be seen from comparative Examples 1 and 2, because it is necessary on a conventional converting lens to decrease the NA in order to hold the spherical aberration to 0.1102$\lambda$rms, a total length TL of 20mm is necessary. On the other hand, as can be seen from the present invention, the spherical aberration is 0 and the total length is 4–8 mm, which is much shorter than the comparative examples.

Furthermore, since the sine condition is satisfied on the converting lens, even if the lens is made eccentric to the optical axis in the amount of 30', the aberration generated is less than 0.01$\lambda$rms, which is extremely small. In other words, when the converting lens of the present invention is assembled into an optical system, the precision of establishing the position with respect to eccentricity can be relaxed.

As described above, with the beam converting optical system of the present invention, a beam converting optical system can be realized on which it easy to position the optical elements, which has a comparatively short total length, and which has good aberration correction.

Additionally, the beam converting optical system of the present invention can be adapted to a beam converting optical system for excimer laser which emits rectangular cross-shaped light beam.

While the invention has been described in relation to preferred embodiments, many modifications and variations are apparent from the description of the invention and all such modifications and variations are intended to be within the scope of the present invention as defined in the appended claims.

What is claimed is:

1. A beam converting optical system for converting light beams having an oval cross-sectional shape into parallel light beams having a substantially circular cross-sectional shape, the system comprising a converting lens having two elliptic cylinder surfaces each having a horizontal cross-section forming an ellipse, each ellipse having the same focal point.

2. The beam converting optical system of claim 1, wherein said two elliptic cylinder surfaces have concave surfaces that face toward the light beams having the oval cross-sectional shape.

3. The beam converting optical system of claim 1, wherein the converting lens is a Galilean type lens.

4. The beam converting optical system of claim, 1, wherein the converting lens is a Keplerian type lens.

5. The beam converting optical system of claim 1, further comprising:

a semiconductor laser for emitting light having the oval cross-sectional shape;

a collimator lens for converting the light emitted by said laser into parallel light beams; and a beam splitter for splitting the light received from said converting lens, wherein said converting lens expands the parallel light beams in a predetermined direction and converts the parallel light beams received from said collimator lens into parallel light beams having the substantially circular cross-sectional shape.

6. The beam converting optical system of claim 1, further comprising:

a semiconductor laser for emitting light beams having the oval cross-sectional shape;

a collimator lens for converting the light emitted by said laser into parallel light beams; and a beam splitter for receiving the parallel light beams having the oval cross-sectional shape from said collimator lens, said converting lens receiving the parallel light beams from said beam splitter and converting the parallel light beams into parallel light beams having the circular cross-sectional shape.

7. The beam converting optical system of claim 1, wherein said converting lens includes a plano-concave surface and a plano-convex surface.

8. The beam converting optical system of claim 1, wherein the system is an aplanatic afocal system.

9. A beam converting optical system for converting light beams, the system comprising:

a light creating device for forming oval cross-shaped light beams; and converting means for converting the oval cross-shaped light beams into parallel light beams having a substantially circular cross-sectional shape, the converting means having a first surface receiving the oval cross-shaped light beams and a second surface outputting the substantially circular cross-sectional light beams, wherein said first surface and said second surface include two elliptic cylinder surfaces each having a horizontal cross section forming an ellipse, each ellipse having the same focal point.

10. The beam converting optical system of claim 9, wherein said two elliptic cylinder surfaces have concave surfaces that face toward the oval cross-shaped light beams.

11. The beam converting optical system of claim 9, wherein the converting means include a Galilean type lens.

12. The beam converting optical system of claim 10, wherein the converting means includes a Keplerian type lens.

13. The beam converting optical system of claim 9, further comprising:

a semiconductor laser for emitting light having the oval cross-shape;

a collimator lens for converting the light emitted by said laser into parallel light beams; and a beam splitter for splitting the light received from said converting means, wherein said converting means expands the parallel light beams in a predetermined direction and converts the parallel light beams received from said collimator lens into parallel light beams having the substantially circular shape.

14. The beam converting optical system of claim 10, further comprising:

a semiconductor laser for emitting the oval cross-shaped light beams;

a collimator lens for converting the light emitted by said laser into parallel light beams; and a beam splitter for receiving the parallel light beams having the oval cross-shape from said collimator lens, said converting means receiving the parallel light beams from said beam splitter and converting the parallel light beams having the oval cross-shape from said beam splitter into parallel light beams having the circular cross-sectional shape.

15. The beam converting optical system of claim 9, wherein said converting means includes a plano-concave cylindrical lens and a plano-convex cylindrical lens.

16. The beam converting optical system of claim 9, wherein the system is an aplanatic afocal system.

* * * * *